US012577815B2

(12) United States Patent
Bendel et al.

(10) Patent No.: US 12,577,815 B2
(45) Date of Patent: Mar. 17, 2026

(54) MOTOR VEHICLE AND USE OF A TRACTION BATTERY

(71) Applicant: KIEKERT AG, Heiligenhaus (DE)

(72) Inventors: Thorsten Bendel, Oberhausen (DE); Armin Handke, Duisburg (DE); Tobias Klocke, Mettmann (DE)

(73) Assignee: Kiekert AG, Heiligenhaus (DE)

( * ) Notice: Subject to any disclaimer, the term of this patent is extended or adjusted under 35 U.S.C. 154(b) by 52 days.

(21) Appl. No.: 18/689,183

(22) PCT Filed: Aug. 18, 2022

(86) PCT No.: PCT/DE2022/100612
§ 371 (c)(1),
(2) Date: Mar. 5, 2024

(87) PCT Pub. No.: WO2023/036360
PCT Pub. Date: Mar. 16, 2023

(65) Prior Publication Data
US 2024/0418016 A1     Dec. 19, 2024

(30) Foreign Application Priority Data
Sep. 7, 2021     (DE) ..................... 10 2021 123 099.3

(51) Int. Cl.
*E05B 81/82*     (2014.01)
*B60L 3/00*     (2019.01)
(Continued)

(52) U.S. Cl.
CPC ............. *E05B 81/82* (2013.01); *B60L 3/0007* (2013.01); *B60L 58/20* (2019.02); *B60L 58/24* (2019.02)

(58) Field of Classification Search
CPC .......... E05B 81/82; B60L 58/20; B60L 58/24; B60L 58/0007
(Continued)

(56) References Cited

U.S. PATENT DOCUMENTS

2013/0337308 A1* 12/2013 Rathmacher ............ B60L 58/24
429/100
2017/0166076 A1* 6/2017 Yoon ...................... H02J 7/0013
(Continued)

FOREIGN PATENT DOCUMENTS

DE           69509316 T2      8/1999
DE     102012204788 A1 *   9/2013   .............. B60L 50/40
(Continued)

OTHER PUBLICATIONS

International Search Report mailed Oct. 27, 2022, for priority International Application No. PCT/DE2022/100612.

*Primary Examiner* — Nathan Cumar
(74) *Attorney, Agent, or Firm* — Renner, Otto, Boisselle & Sklar, LLP

(57)                     ABSTRACT
A motor vehicle, in particular electric motor vehicle or hybrid motor vehicle, which is equipped with at least one electromotively actuable motor vehicle lock, and with at least one on-board battery and with an emergency battery for application of an electromotive drive of the motor vehicle lock during normal operation and during emergency operation. According to the invention, a traction battery provided for driving the motor vehicle acts as the emergency battery during emergency operation.

12 Claims, 2 Drawing Sheets

(51) Int. Cl.
    *B60L 58/20*         (2019.01)
    *B60L 58/24*         (2019.01)
(58) Field of Classification Search
    USPC .......................................................... 70/237
    See application file for complete search history.

(56)                     References Cited

U.S. PATENT DOCUMENTS

| | | | |
|---|---|---|---|
| 2018/0354387 A1 * | 12/2018 | Wand .................. | H01M 10/425 |
| 2019/0061654 A1 * | 2/2019 | Tsuji ...................... | B60R 16/03 |
| 2020/0070775 A1 * | 3/2020 | Linden .................. | B60R 16/033 |
| 2021/0213850 A1 * | 7/2021 | Carpenter ............. | G07C 5/008 |
| 2022/0126695 A1 | 4/2022 | Park | |

FOREIGN PATENT DOCUMENTS

| | | | | |
|---|---|---|---|---|
| DE | 102015205343 A1 | | 9/2016 | |
| DE | 102018100551 A1 * | | 7/2019 | ............ E05B 81/86 |
| DE | 10 2020 113 869 A1 | | 6/2021 | |
| DE | 102019008825 A1 | | 6/2021 | |
| EP | 3620321 A1 | | 3/2020 | |
| KR | 10-2015-0015 051 A | | 2/2015 | |
| WO | WO-2016150431 A1 * | | 9/2016 | ............ E05B 81/54 |

\* cited by examiner

MOTOR VEHICLE AND USE OF A TRACTION BATTERY

This application is a national phase of International Application No. PCT/DE2022/100612 filed Aug. 18, 2022, which claims priority to German Patent Application No. 10 2021 123 099.3 filed Sep. 7, 2021, each of which is hereby incorporated herein by reference in its entirety.

FIELD OF DISCLOSURE

The invention relates to a motor vehicle, in particular an electric motor vehicle or hybrid motor vehicle, with at least one electromotively actuable motor vehicle lock, and with at least one on-board battery and an emergency battery for energizing an electromotive drive of the motor vehicle lock during normal operation and during emergency operation.

BACKGROUND OF DISCLOSURE

Electromotively actuable motor vehicle locks are usually designed in such a manner that the electric motor can be used to open a mandatory locking mechanism consisting of a catch and pawl. To do this, the pawl is lifted from its engagement with the catch so that a locking bolt previously caught by the catch is released. The associated motor vehicle door can be opened. In principle, the electromotive drive for the motor vehicle lock can also be used and operate in such a manner that the previously mentioned locking mechanism is unlocked with its help and can subsequently be opened mechanically, for example.

Either way, normal operation of such a motor vehicle and the associated motor vehicle lock requires that the electromotive drive is supplied with sufficient electrical energy by means of the on-board battery in order to be able to open the locking mechanism electromotively in the example case described or at least to ensure unlocking. If such a motor vehicle is involved in an accident or crash, the system switches to emergency mode. The same applies if the on-board battery has failed. In emergency mode, the additional emergency battery provides power to the electromotive drive of the motor vehicle lock instead of the on-board battery.

In this manner, the motor vehicle lock in question can also be opened or at least unlocked by an electric motor using the emergency battery in emergency mode. This is necessary in order to enable rescue personnel arriving at the motor vehicle after such an accident or crash to open the motor vehicle door and thus gain access to any passengers inside the motor vehicle who may need care.

In the prior art according to KR 10-2015-0015 051 A, an electric lock is supplied with the necessary electrical energy during normal operation using the on-board battery. An additional external emergency power source is also implemented, which can be connected via a USB port, for example.

The generic prior art according to DE 695 09 316 T2 relates to an arrangement consisting of a motor vehicle door and an associated electric door lock. The electric door lock is opened by actuating an actuating element which is powered by the vehicle battery or the on-board battery. In the event of a malfunction in the power supply of the aforementioned on-board battery, the electric door lock can be opened by the power supply provided by a backup battery. For this purpose, the backup battery is arranged in the associated motor vehicle door, to which the electric door lock belongs. This has proven to be fundamentally successful.

In practice, however, the additional realization of a backup battery or emergency battery inside the motor vehicle door or inside a lock housing of the motor vehicle lock not only leads to increased costs, but also to an increased weight of the motor vehicle door in question or of the motor vehicle lock or of both. This is disadvantageous in that the motor vehicle door must be opened by a user, which results in increased operating forces.

In addition, the proper functioning of the emergency battery must be guaranteed for the entire service life of the motor vehicle in question. As a rule, this requires the emergency battery to be replaced every few years. In addition, the emergency battery usually has to be charged externally or internally using the on-board battery. Nevertheless, malfunctions in the event of a crash cannot be ruled out with absolute certainty. This is where the invention steps in.

SUMMARY OF DISCLOSURE

The invention is based on the technical problem of further developing such a motor vehicle, and in particular an electric motor vehicle or hybrid motor vehicle, in such a way that it is possible to open the door without problems following a crash or the failure of the on-board battery, even over long time scales, in a functionally reliable manner and with reduced effort compared to the previous state of the art.

To solve this technical problem, the invention proposes that in a motor vehicle of the same type, and in particular an electric motor vehicle or hybrid motor vehicle, a traction battery provided for driving the motor vehicle acts as an emergency battery during emergency operation.

The invention therefore makes use of a special emergency battery which, in emergency operation, controls the electromotively actuable motor vehicle locks. In fact, the emergency battery in question is the traction battery intended to power the vehicle. The invention is based on the realization that electric motor vehicles or hybrid motor vehicles typically have a traction battery in addition to the on-board battery, which is still implemented and intended unchanged, and which (exclusively) provides the drive for the motor vehicle in electric mode. For this purpose, the motor vehicle in question has at least one electric motor, which is driven with the aid of the traction battery, in order to either move the motor vehicle purely electrically or to support the drive with the aid of an internal combustion engine, for example.

The traction battery is realized and provided independently of the on-board battery and is therefore usually not charged by an additional generator (alternator), but rather by recuperators or at a charging station of an electric charging infrastructure.

For this reason, the supply voltage for the electric motor of the additional drive provided by such a traction battery is usually designed to be much higher than the vehicle electrical system voltage provided by the on-board battery. In fact, such traction batteries usually operate at high voltage, which can be up to several 100 V, whereas the vehicle electrical system voltage typically has values of 12 V to max. 48 V, if only to avoid any health hazards to users.

For this reason, the traction battery, which typically operates at high voltage, is usually designed to be completely separate, both mechanically and electrically, from the on-board battery and also from the on-board electrical system and the body of the motor vehicle. Mechanical separation of the traction battery is typically provided by a cage housing the traction battery or some other type of housing inside the body of the motor vehicle, if only to prevent damage to the traction battery in the event of a crash.

For this reason, the traction battery is usually also placed in an underbody and away from the crumple zones of the associated motor vehicle. The electrical insulation is provided by supply lines that connect the traction battery in question to the at least one electric motor for driving the motor vehicle on the one hand and to a charging socket on the other hand. The supply lines expressly do not use the body of the motor vehicle, as is regularly the case for the earth line or the negative terminal for the vehicle electrical system voltage and the on-board battery. Rather, the supply lines for the two poles of the traction battery, which usually operates with DC voltage, are expressly electrically insulated from the body. In any case, the traction battery is designed to be both mechanically and electrically separate from the on-board battery and thus from the vehicle electrical system voltage.

In this manner, even in the event of a crash or accident, or even if the on-board battery has other malfunctions, i.e. in emergency mode, it can be assumed that the traction battery is still functional and can therefore be used as an emergency battery to power the electromotive drive inside the motor vehicle lock. The motor vehicle lock in question can be any conceivable motor vehicle lock present in or on the vehicle body. These include not only motor vehicle door locks, motor vehicle tailgate locks or motor vehicle hood locks, but also locks on fuel filler flaps, loading flaps or inside the motor vehicle in connection with a glove compartment or other storage compartments, for example. In any case, all of these electromotively actuable motor vehicle locks can be reliably opened in accordance with the invention, even in emergency operation, because in emergency operation the traction battery provided for the drive of the motor vehicle acts as an emergency battery, which is also functional in the event of a failure of the on-board battery and consequently in emergency operation. These are the main advantages.

Consequently, it is also the subject matter of the invention to use a traction battery of an electric motor vehicle or hybrid motor vehicle as an emergency battery for energizing an electromotive drive of a motor vehicle lock.

The use of the traction battery in this context is formulated as an independent claim.

In a further advantageous embodiment, the traction battery is electrically connected to the relevant motor vehicle lock via a switchover device. In this context, the switchover device is inactive in normal operation and only works in emergency operation. This means that in normal operation, the switchover device ensures that the traction battery is electrically disconnected from the motor vehicle lock. Only when emergency operation occurs and is observed does the switchover device operate and ensure that the motor vehicle lock in question can be supplied with electricity using the traction battery.

For this purpose, the switchover device is usually designed as a switch device that can be actuated during an opening process of the motor vehicle lock or has such a device. This means that, in the simplest case, the switchover device can be the switch device that can be actuated or is actuated when the motor vehicle lock is opened. Such a switch device may be designed as a simple switch that is assigned to an outside door handle, for example, and is activated when the outside door handle is activated to open the motor vehicle door and thus the associated motor vehicle lock. In principle, the switch device can of course also be designed independently of the outside door handle. In principle, manual actuation of the switch device is possible and conceivable, as is actuation of the switch device using a remote control.

As a rule, however, the switch device is assigned to the outside door handle and is activated as soon as the outside door handle is actuated. The overall design is such that in normal operation, actuation of the switch device to open the motor vehicle lock ensures that the motor vehicle lock is supplied with the required electrical energy by the on-board battery. In emergency operation, the switch device, designed as a switchover device in the example, ensures that the motor vehicle lock is supplied with electricity using the traction battery, which acts as an emergency battery.

In most cases, however, the switch device is a component of the switchover device. The invention is based on the additional insight that the switchover device is actuated by means of a control unit to change from normal operation to emergency operation. For this purpose, the control unit can evaluate the signal from a sensor, for example. The sensor may be a crash sensor. Alternatively or additionally, the sensor can also be used to evaluate the vehicle electrical system voltage. If the vehicle electrical system voltage falls below a predefined value, for example 10 V or 8 V, the control unit switches from normal operation to emergency operation depending on the signal from the relevant sensor. The same applies if the crash sensor transmits a corresponding signal to the control unit.

Nowadays, modern motor vehicles are equipped with such a crash sensor, which is designed as an acceleration sensor and reports decelerations above a determined threshold to the control unit, which then activates the corresponding safety devices such as airbags, belt tighteners, etc. According to the invention, the signal from the relevant crash sensor is additionally used and converted by the control unit in order to be able to switch from normal operation to emergency operation.

In addition, the switchover device advantageously has a conversion unit that has a voltage-dependent resistor. This voltage-dependent resistor is usually an electronic resistor such as a varistor. The voltage-dependent resistor as a component of the switchover device ensures that the (high) voltage provided by the traction battery in emergency operation and also the available current are reduced to such an extent that the electromotive drive in the motor vehicle lock can be controlled and, in particular, is not destroyed in the process. In addition, the voltage-dependent resistor provides protection against overvoltage when the electromotive drive of the motor vehicle lock is energized. Of course, other devices, such as voltage and current transformers, can also be used here, which together ensure that the electrical energy provided by the traction battery can be used precisely to control the electromotive drive of the motor vehicle lock in emergency operation.

In this context, the further possibility according to the invention should also be seen that a time control is also connected with the aid of the switchover device, within which the electromotive drive of the motor vehicle lock is controlled in order to prevent any overheating. In the simplest case, instead of the voltage-dependent resistor in connection with the switchover device, a mechanical relay can also simply be used, which ensures the desired conversion of the electrical energy provided by the traction battery to control the electromotive drive of the motor vehicle lock.

According to a further advantageous embodiment, the switchover device can be arranged for the most part inside a motor vehicle lock housing. In this case, the motor vehicle lock is upgraded, as it were, according to the invention by the switchover device, which generally only needs to be connected to the externally provided switch device when installed in the motor vehicle. In principle, however, the switch device can also be integrated into the motor vehicle lock housing, so that in such a case the switchover device is completely located inside the motor vehicle lock housing. This provides a particularly compact and cost-effective variant because, inter alia, a separate housing for the switchover device is not required, but rather the existing motor vehicle lock housing is used to enclose the switchover device.

As a result, a motor vehicle and the use of a traction battery of such a motor vehicle are described, wherein the traction battery is used as an emergency battery to power the electromotive drive of a motor vehicle lock belonging to the motor vehicle door or functions as such. This procedure eliminates the need for an additional backup battery on the motor vehicle lock in question. In addition, such backup batteries usually have to be provided on every motor vehicle lock, whereas according to the invention, only the already existing traction battery is used as an emergency battery during emergency operation. This results in a particularly cost-effective and compact design with weight advantages.

In addition, the traction battery also provides and can supply the electrical energy required for emergency operation of the motor vehicle lock when switching from normal operation to emergency operation, i.e. when the on-board battery no longer provides any or sufficient electrical energy. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
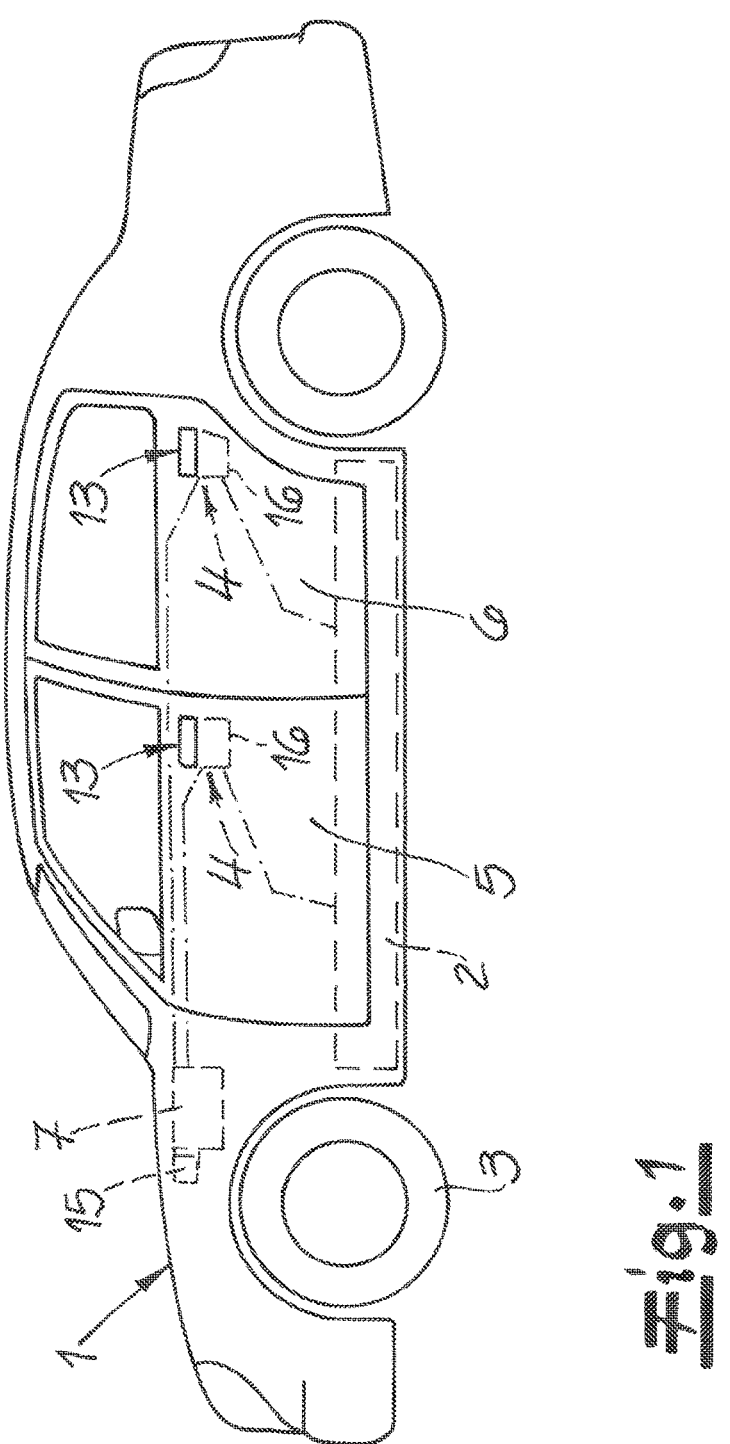
FIG. 1 schematically shows the motor vehicle according to the invention.

The figures show a motor vehicle which, according to the exemplary embodiment, is designed as an electric motor vehicle or hybrid motor vehicle. For this purpose, the motor vehicle first of all has a body 1. Inside the body 1, more precisely in or on its underbody, a traction battery 2 is realized, which is accommodated in its own housing or cage. The traction battery 2 usually extends in the space between the drive wheels 3 of the motor vehicle. FIG. 1 also shows two electromotively actuable motor vehicle locks 4, namely a motor vehicle lock 4 on a front side door 5 and another motor vehicle lock 4 on a rear side door 6. Of course, this only applies as an example and is in no way to be understood as restrictive.

The traction battery 2 can be used to supply one or more additional electric motors with electrical energy in order to drive the motor vehicle shown or the drive wheels 3. If the electric motors alone provide the drive, it is an electric vehicle. Alternatively, the motor vehicle can also operate as a hybrid motor vehicle. In this case, the one or more electric motors not expressly shown are implemented in addition to an internal combustion engine and provide the drive for the drive wheels 3 as an alternative or supplement to the relevant internal combustion engine.

In addition to the traction battery 2, the motor vehicle shown is also equipped with an on-board battery 7. The on-board battery 7 supplies an on-board electrical system and, inter alia, according to the exemplary embodiment, the two shown or all motor vehicle locks 4 with the required electrical energy.

Figure 2:
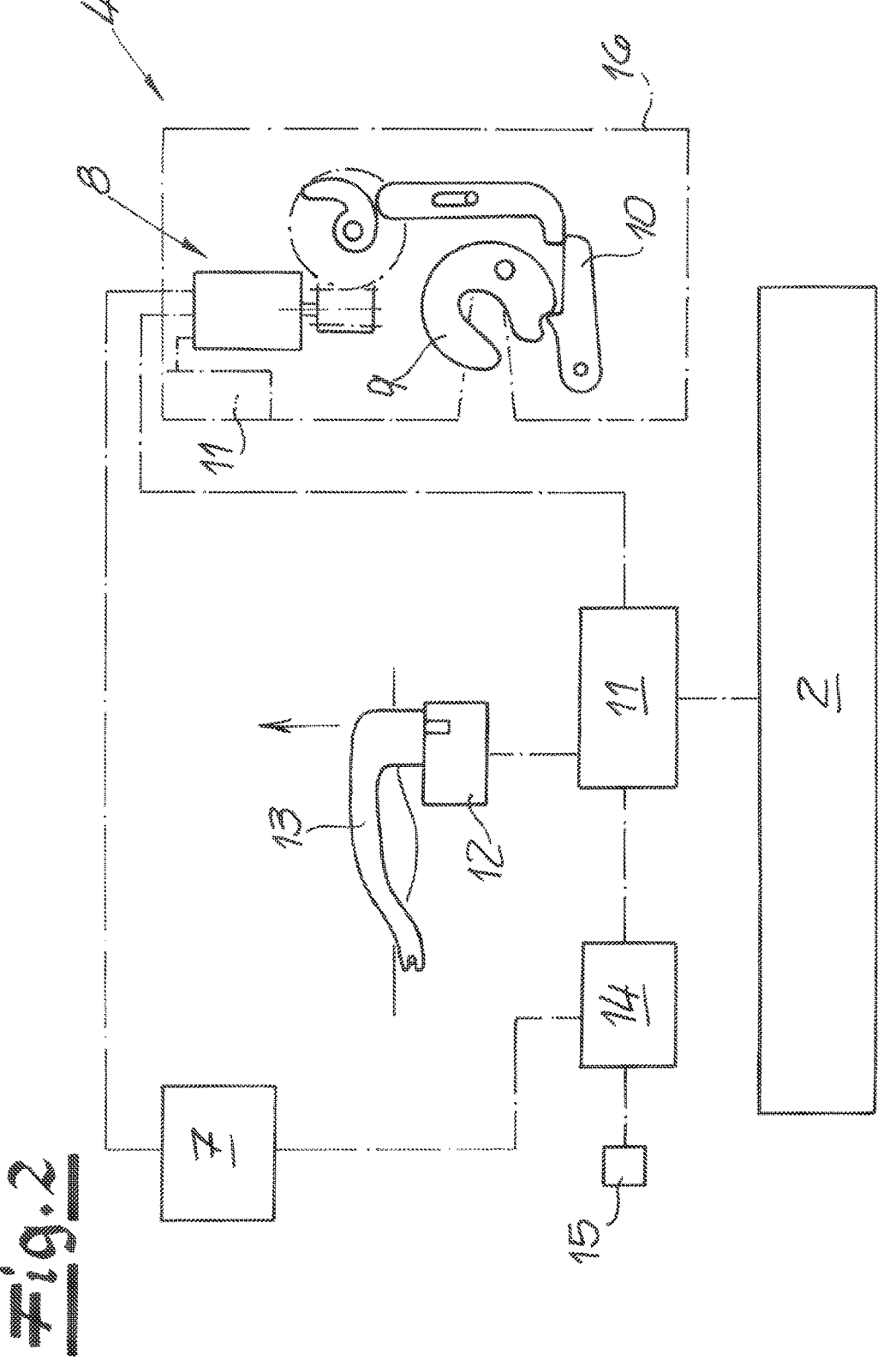
FIG. 2 shows the switching realized at this point to implement emergency operation.

The motor vehicle lock 4 in question is in fact equipped with an electromotive drive 8, which is merely hinted at, and which can be used to open a locking mechanism 9, 10, schematically indicated in FIG. 2, consisting of catch 9 and pawl 10. In fact, according to the exemplary embodiment, the electromotive drive 8 operates indirectly or directly on the pawl 10 and lifts it from its latching engagement with the catch 9 to open the motor vehicle lock 4 electrically. As a result of this, a locking bolt that was previously caught by the catch 9 and is not expressly shown is released, so that the relevant motor vehicle door 5, 6 can then be opened. In normal operation, this is ensured by the on-board battery 7.

For this purpose, the on-board battery 7 operates with low DC voltage in the range of 12 V to approx. 48 V, as already described and explained at the beginning. In contrast, the traction battery 2 is designed to be mechanically and electrically separate from the on-board battery 7, because the traction battery 2 generally also works with DC voltage, albeit with a high voltage of several 100 V in the example case.

As already explained, the on-board battery 7 ensures that the electromotive drive 8 of the relevant motor vehicle lock 4 is energized during normal operation. In accordance with the invention and in emergency operation, the traction battery 2 originally intended for driving the drive wheels 3 of the motor vehicle acts as the emergency battery for the electromotive drive 8 of the motor vehicle lock. In detail, the traction battery 2 is electrically connected to the relevant motor vehicle lock 4 via a switchover device 11, 12. For this purpose, the switchover device 11, 12 has a switch device 12 that can be actuated during an opening operation of the motor vehicle lock 4.

According to the exemplary embodiment, the switch device 12 is provided and arranged on or in the region of an outside door handle 13. If, during emergency operation, the outside door handle 13 is actuated to open the motor vehicle lock 4, which corresponds to a movement indicated in the direction of the arrow in FIG. 2, this results in the switch device 12 being energized. In addition to the switch device 12, the switchover device 11, 12 in the exemplary embodiment also has a conversion unit 11. With the aid of the conversion unit 11, the electrical energy provided by the traction battery 2 in emergency operation is adapted to the requirements of the electromotive drive of the motor vehicle lock 4. For this purpose, the conversion unit 11 and thus the switchover device 11, 12 can be designed with a voltage-dependent resistor, not expressly shown, in the form of an electronic resistor and, for example, a varistor. In principle, however, it is also conceivable that the conversion unit 11 works with a relay in this context. Voltage-to-current converters and timers are also conceivable in order to adapt the electrical energy provided by the traction battery 2 to the requirements of the electromotive drive 8 of the motor vehicle lock 4 and to prevent the electromotive drive 8 from overheating via the timer or to ensure that it is switched off in good time during emergency operation.

Based on FIG. 2 it can be seen that additionally a control unit 14 is also provided. The design is such that the switchover device 11, 12 is actuated with the aid of said control unit 14 to switch from normal operation to emergency operation. For this purpose, the control unit 14 generally evaluates the signal from at least one sensor 15. The sensor 15 may be one that is used to monitor the vehicle electrical system voltage provided by the on-board battery 7. Alternatively or additionally, the sensor 15 can also be designed as a crash sensor. The switchover device 11, 12 can be installed as a whole or for the most part inside a motor vehicle lock housing 16, which is indicated by a dotted line in FIG. 2. This provides a particularly compact and cost-effective design.

The mode of operation is as follows. In normal operation, i.e. as long as the on-board battery 7 provides a certain minimum voltage and minimum current stored in the control unit 14, for example, the electromotive drive 8 of the motor vehicle lock 4 is supplied with electrical energy exclusively with the aid of the on-board battery 7. In this case, the switchover device 11, 12 is inactive. However, if emergency operation occurs because the evaluation of the signal from the sensor 15 by the control unit 14 indicates a crash or an insufficient power supply from the on-board battery 7, the switchover device 11, 12 is switched to emergency operation with the aid of the control unit 14 and is active.

The active switchover device 11, 12 now ensures (in conjunction with the control unit 14) that the electromotive drive 8 is no longer supplied with the required electrical energy using the on-board battery 7, but rather via the traction battery 2, which acts as an emergency battery in emergency operation. In this context, the conversion unit 11 as a component of the switchover device 11, 12 ensures that the electrical power provided by the traction battery 2 is adapted to the electrical power required by the electromotive drive 8. It also ensures that the electromotive drive 8 in emergency mode is only actuated, for example, for as long as is required following actuation of the switch device 12 with the aid of the outside door handle 13 until the catch 9 and thus the associated motor vehicle door 5, 6 is safely opened.

LIST OF REFERENCE NUMBERS

Body 1
Traction battery 2
Drive wheels 3
Motor vehicle lock 4
Front side door 5
Rear side door 6
On-board battery 7
Electromotive drive 8
Locking mechanism 9,10
Catch 9
Pawl 10
Switchover device 11, 12
Conversion unit 11
Switch device 12
Outside door handle 13
Control unit 14
Sensor 15
Motor vehicle lock housing 16

The invention claimed is:

1. A motor vehicle comprising:
at least one electromotively actuable motor vehicle lock including an electromotively actuable motor drive;
at least one on-board battery for energizing the electromotively actuable motor drive of the motor vehicle lock in a normal operation;
an emergency battery for energizing the electromotively actuable motor drive of the motor vehicle lock in an emergency operation in which there is a loss of power from the on-board battery to the motor vehicle lock,
wherein in the emergency operation, the emergency battery is a traction battery configured for driving the motor vehicle, the traction battery being different from the on-board battery; and
a switchover device, wherein the traction battery is electrically connected to the motor vehicle lock with the interposition of the switchover device, wherein the switchover device is equipped with a conversion unit configured to convert electrical energy provided by the traction battery to control the electromotively actuatable motor drive,
wherein an input of the conversion unit is an output of the traction battery and an output of the conversion unit is provided to the electromotively actuable motor drive, and
wherein the conversion unit is inactive during normal operation.

2. The motor vehicle according to claim 1, wherein the switchover device comprises an electric switch configured to be actuated during an opening operation of the motor vehicle lock.

3. The motor vehicle according to claim 2, further comprising an outside door handle, wherein the electric switch is configured to be actuated by operation of the outside door handle.

4. The motor vehicle according to claim 1, wherein the switchover device configured to be inactive to electrically disconnect the traction battery from the motor vehicle lock in the normal operation, and to operate only in the emergency operation to electrically connect the traction battery to the motor vehicle lock in the emergency operation.

5. The motor vehicle according to claim 4, further comprising a control unit, wherein the switchover device is actuated with the control unit to change from the normal operation to the emergency operation.

6. The motor vehicle according to claim 5, further comprising a sensor, wherein the control unit evaluates a signal from the sensor to control the switchover device to change from the normal operation to the emergency operation.

7. The motor vehicle according to claim 6, wherein the sensor is at least one of a crash sensor that detects a crash and a voltage sensor that monitors an output voltage of the on-board battery.

8. The motor vehicle according to claim 5, wherein the control unit includes a time control to limit time of operation of the traction battery to prevent overheating.

9. The motor vehicle according to claim 1, wherein the conversion unit has a voltage-dependent resistor.

10. The motor vehicle according to claim 1, wherein the switchover device is arranged at least in part inside a motor vehicle lock housing that houses the motor vehicle lock.

11. The motor vehicle according to claim 1, wherein the traction battery is mechanically and electrically separated from the on-board battery.

12. A method of operating a motor vehicle comprising using a traction battery of an electric motor vehicle or hybrid motor vehicle as an emergency battery for energizing an electromotive drive of a motor vehicle lock,
wherein the motor vehicle includes a switchover device,
wherein the traction battery is electrically connected to the motor vehicle lock with the interposition of the switchover device, wherein the switchover device is equipped with a conversion unit configured to convert electrical energy provided by the traction battery to control the electromotively actuatable motor drive,

wherein an input of the conversion unit is an output of the traction battery and an output of the conversion unit is provided to the electromotively actuable motor drive, and wherein the conversion unit is inactive during normal operation.

* * * * *